3,521,401
TREE SUPPORTING UNIT
Edgar P. Shisler, 248 N. Liberty St.,
Delaware, Ohio 43015
Filed May 29, 1968, Ser. No. 733,085
Int. Cl. A01g 17/10
U.S. Cl. 47—43                      1 Claim

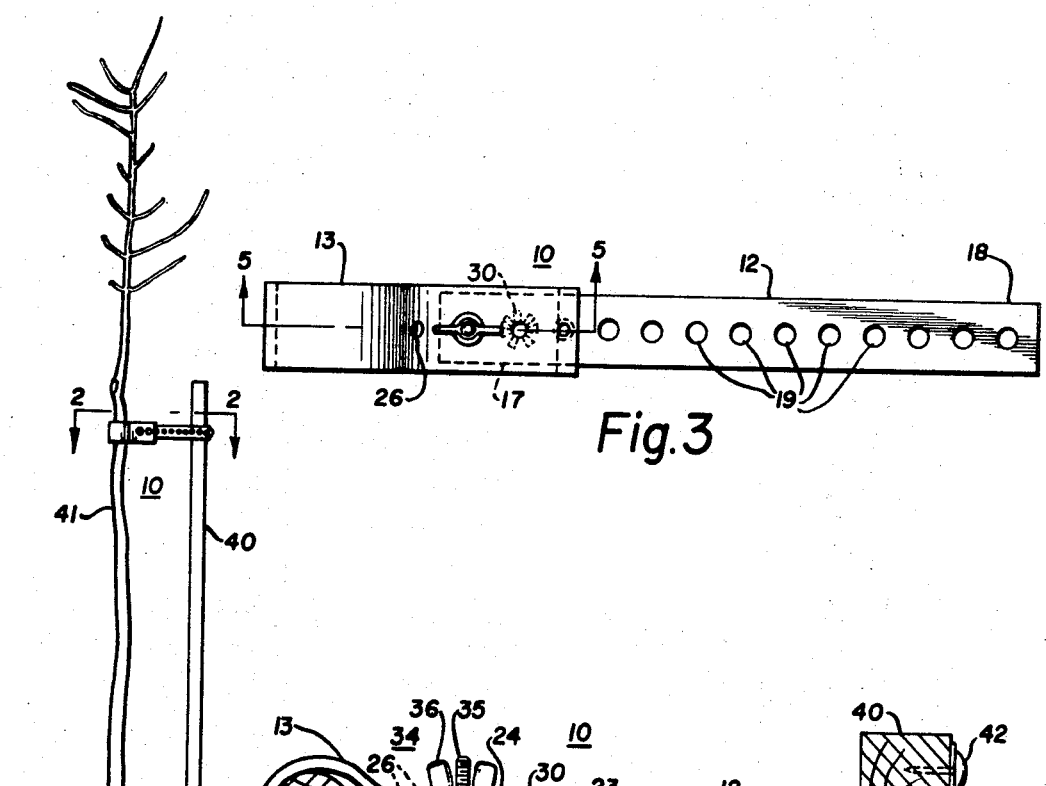
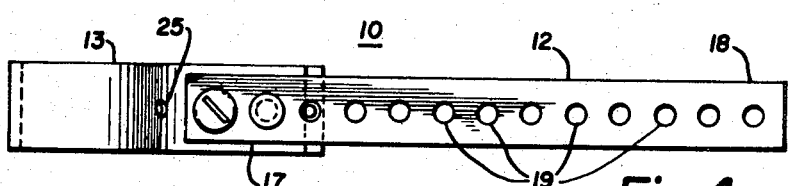
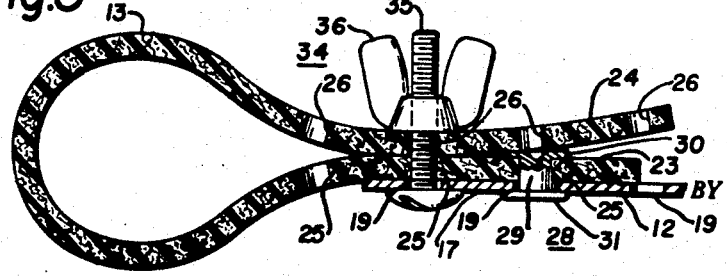

ABSTRACT OF THE DISCLOSURE

This invention relates to a tree support which is adjustable with respect to a given tree diameter to be encircled and adjustable with respect to the distance between the tree and a stationary base. The tree encircling portion is non-abrasive.

---

My invention relates in general to support mechanisms and more particularly to a non-abrasive tree supporting unit.

During the early growing period of young trees and after such trees have been transplanted, they quite often collapse or bend because of their own weight, storms, or misuse by children, and as a result, they tend to grow in a disorderly and crooked direction. This results in a rather unslightly looking tree. As a result of these conditions, it has become necessary to support young trees until the initial growing season has been concluded.

Another difficulty arising from the present methods utilized to support trees is the fact that the portion of the support which engages the tree is of a rough, abrasive nature and since the bark on the young tree is very fragile, a damaging of the bark results. It is also desirable to have a support which may be easily and readily adjusted so that different sized trees may be supported and also so that the supporter length may be varied in accordance with the amount a tree may grow.

An object of my invention is to provide a support mechanism for supporting young growing trees or transplanted trees until they have progressed sufficiently in their growth that they will be able to support their own weight, and withstand difficult weather conditions or misuse by animals or human beings.

Another object of my invention is to provide a support mechanism which will return trees which are growing in a crooked manner to a proper growing direction.

Another object of my invention is to provide a support mechanism which will maintain young and transplanted trees in a proper growing position until the tree roots have established themselves in the surrounding soil and hence will be able to support the tree without the use of the support mechanism Another object is to provide a supporting structure having a non-abrasive engaging action upon the item supported.

Another object is to provide a supporting structure with an encircling member which may be readily adjusted for supporting articles of varying diameters or cross-sectional areas or at different distances.

Another object is to provide a supporting structure with a flexible encircling member whereby the member may be quickly and readily assembled and disassembled.

Still another object is the provision of a support mechanism with means for readily attaching the support mechanism to a fixed stationary base.

Other objects and a fuller understanding of this invention may be had by referring to the following description and claim, taken in conjunction with the accompanying drawings, in which:

FIG. 1 illustrates the invention as adapted to support a young tree;

FIG. 2 is a view taken generally along the lines 2—2 of FIG. 1;

FIG. 3 is a view of the invention before the bendable member has been bent so as to be attached to a stationary base as shown in FIG. 2;

FIG. 4 is a view of the invention as would be seen by rotating the invention of FIG. 3 through one hundred eighty degrees; and FIG. 5 is a view taken generally along the lines 5—5 of FIG. 3.

The tree support mechanism or unit indicated by the reference numeral 10 includes generally a rigid bendable member 12 and a flexible encircling member 13.

The rigid member 12 comprises a flat metallic unit which may be readily bent and having a first and a second end portion indicated generally by the reference numerals 17 and 18, respectively. The member 12 is provided with a multiplicity of circular positioning apertures 19 located about its length.

The flexible encircling member 13 is constructed of a non-abrasive material and for the purpose of illustration in this invention is preferably of a fabric material impregnated with a rubber-like material. This type construction gives the desired flexibility requirements along with the necessary non-abrasive qualities. This material also provides the necessary resistance to weathering by the elements. This member as constructed is generally flat and includes a first and second end portion indicated generally by the numerals 23 and 24, respectively. Securing openings are provided upon the first and second end portions of the flexible member 13 and are indicated by the reference numerals 25 and 26 respectively.

Fixed rivet securing means 28 which include a rivet 29 having an end portion 30 and a head 31 are provided for securing the first end portion 23 of the flexible member 13 to the first end portion 17 of the rigid member 12. As best seen in FIG. 5, the rivet 29 extends through the rigid member 12 by way of one of the positioning apertures 19 and on through one of the securing openings 25 located in the first end portion 23 of the flexible encircling member 13. The rivet 29 is fixedly secured in place by peaning the end portion 30 over into a fixed position. Thus, the flexible member is fixedly secured to the rigid member.

Removable securing means 34, which include a threaded bolt 35 and a wing nut 36, are provided for removably securing the second end portion 24 of the flexible member 13 to first end portion 17 of the rigid member 12. As illustrated in the accompanying figures, the bolt 35 extends through a positioning aperture 19 on the first end portion 17 of the rigid member 12, through one of the securing openings 25 located on the first end portion 23 of member 13 and on through one of the securing openings 26 located on the second end portion 24 of the encircling member 13. The bolt 35 is thereafter removably and adjustably secured by means of the wing nut 36. As will be apparent from a viewing of the accompanying drawings, the effective circumferential encircling distance of the encircling member 13 may be varied simply by changing the securing opening 26 on the second end portion 24 of the member 13 through which the bolt 35 extends, or it may also be varied by moving the bolt 35 to a different positioning aperture 19 on the bendable member 12. It is also obvious that any number, size and shape of the securing openings and positioning apertures may be utilized to embody the features of this invention.

In operation, a stationary base or anchorable member shown here as a stake 40 is placed next to the article to be supported. This article is illustrated as a young or transplanted tree 41 in FIG. 1. The second end portion 18 of the rigid member 12 is then attached to the stake 40 by suitable means, such as by nails 42 inserted through the positioning apertures 19 and driven into the stake 40. The second end portion 18 may be bent as shown in FIG. 2 or may be maintained in a straight line condition, as shown in FIGS. 3 and 4. If the second end portion 18 is bent, a more firm anchorage is maintained on the stake 40. The second end portion 24 of the encircling member 13 is then detached from the first end portion of the member 12 by unthreading the wing nut 36 and removing the bolt 35. The encircling member 13 is then placed about the tree 41 and then attached again to the first end portion of the rigid member 12 in the reverse manner of that just described.

It will thus be readily seen that the effective encircling circumference of the flexible encircling member may be easily and quickly varied for supporting articles of varying cross-sectional areas and at varying distances from the stationary base. The article will also be supported in a positive manner against drooping, as a result of its own weight, adverse weather or misuse by small children or animals. The non-abrasive encircling member assures that the outside surface of the article will not be scuffed.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A tree-supporting unit comprising a bendable metallic support member having a first and a second portion and having positioning apertures located at intervals along its length, a flexible, non-abrasive element adapted to loop around a portion of a tree, said flexible element having a first and a second end portion and having securing openings located at said first and second end portions thereof, fixed securing means extending through at least one of said positioning apertures on said first end portion of said support member and through at least one of said securing openings on said first end portion of said flexible element thereby fixedly securing said first end portion of said flexible element to said first end portion of said support member, removable securing means for removably securing the second end portion of said flexible element to said first end portion of the support member upon said flexible element being looped around the tree, said removable securing means extending through at least one of said securing openings on said second end portion of said flexible element, through at least one of said securing openings on said first end portion of said flexible element and through at least one of said positioning apertures on said first end portion of said support member thereby removably securing said second end portion of said flexible element to said first and portion of said support member, and means extending through said positioning apertures on said second end portion of said support member for fixedly securing said support member to a stationary base.

References Cited

UNITED STATES PATENTS

| | | | |
|---|---|---|---|
| 1,214,142 | 1/1917 | Dingwall | 47—43 |
| 1,718,971 | 7/1929 | Mueller | 47—42 |
| 2,134,242 | 10/1938. | Wade | 47—47 |

FOREIGN PATENTS

| | | |
|---|---|---|
| 20,089 | 7/1908 | Great Britain. |
| 3,517 | 2/1911 | Great Britain. |
| 519,376 | 2/1931 | Germany. |

ROBERT E. BAGWILL, Primary Examiner

U.S. Cl. X.R.

248—71, 221